US006218055B1

(12) United States Patent
Shah et al.

(10) Patent No.: US 6,218,055 B1
(45) Date of Patent: Apr. 17, 2001

(54) ELECTROCHEMICAL POWER CELLS AND METHOD OF IMPROVING ELECTROCHEMICAL POWER CELL PERFORMANCE

(75) Inventors: Pinakin M. Shah, New Freedom, PA (US); Marvin L. Kronenberg, Needham, MA (US); Richard F. Bis, Mt. Airy, MD (US); Donald L. Warburton, Fulton, MD (US); Joseph J. Bytella, Baltimore, MD (US); Dayal T. Meshri, Tulsa, OK (US)

(73) Assignee: Mine Safety Appliances Company, Pittsburgh, PA (US)

( * ) Notice: Subject to any disclaimer, the term of this patent is extended or adjusted under 35 U.S.C. 154(b) by 0 days.

(21) Appl. No.: 09/363,484

(22) Filed: Jul. 29, 1999

Related U.S. Application Data

(63) Continuation-in-part of application No. 09/092,192, filed on Jun. 5, 1998, now Pat. No. 6,180,284.

(51) Int. Cl.$^7$ .................................................... H01M 6/16
(52) U.S. Cl. ...................... 429/340; 429/218.1; 429/215; 429/231.7; 429/231.8; 429/231.95
(58) Field of Search ................................. 429/307, 340, 429/231.95, 213, 215, 217, 231.8, 218.1, 231.7

(56) References Cited

U.S. PATENT DOCUMENTS

| 3,547,703 | | 12/1970 | Blomgren et al. | |
| 3,607,013 | | 9/1971 | Saldick. | |
| 3,616,335 | * | 10/1971 | Carson et al. | 429/199 |
| 3,870,561 | * | 3/1975 | Charbonnier et al. | 429/102 |
| 3,985,577 | * | 10/1976 | Russell | 429/194 |
| 4,041,220 | * | 8/1977 | Armand | 429/191 |
| 4,399,204 | | 8/1983 | Clark | 429/197 |
| 4,578,327 | * | 3/1986 | Saito et al. | 429/218.1 |
| 4,690,877 | * | 9/1987 | Gabano et al. | 429/194 |
| 5,229,227 | * | 7/1993 | Webber | 429/218.1 |
| 5,491,040 | * | 2/1996 | Chaloner-Gill | 429/192 |
| 5,569,560 | * | 10/1996 | Olsen et al. | 429/192 |

FOREIGN PATENT DOCUMENTS 59-151769   8/1984   (JP).

OTHER PUBLICATIONS

Arai H et al.: "Cathode performance and voltage estimation of metal trihalides"; Journal of Power Sources, vol. 68, No. 2 Oct. 1, 1997, pp 716–19.
Chemical Abstracts+Indexes, vol. 120, No. 13 Jul. 27, 1994, XP000664060.

* cited by examiner

*Primary Examiner*—Laura Weiner
(74) *Attorney, Agent, or Firm*—James G. Uber; Henry E. Bartony, Jr.

(57) ABSTRACT

A small, portable electrochemical power cell, having an output voltage of over 4 V, and preferably over 5 V, includes an anode, a cathode having a fluorine compound and an electrolyte having an organic sulfur-containing compound to maintain ionic conductivity between the anode and the cathode. A method of fabricating such an electrochemical power cell includes the step adding an electrolyte having an organic, sulfur-containing compound to maintain electrical conductivity between the anode and the cathode. An electrochemical power cell having a lithium anode, a $CoF_3$ cathode, an electrolyte to maintain ionic conductivity between the anode and the cathode and a cobalt complexing material within the electrolyte to complex cobalt ions is described.

22 Claims, 9 Drawing Sheets

ELECTROCHEMICAL POWER CELLS AND METHOD OF IMPROVING ELECTROCHEMICAL POWER CELL PERFORMANCE

RELATED REFERENCES

The present application is a continuation-in-part of U.S. patent application Ser. No. 09/092,192, filed on Jun. 5, 1998, now U.S. Pat. No. 6,180,284, the disclosures of which is incorporated herein by reference.

FIELD OF THE INVENTION

The present invention pertains to electrochemical power cells (that is, batteries) and to a method for improving electrochemical power cell performance, and, more particularly, to electrochemical power cells having a cathode comprising a fluorine compound, to electrochemical power cells comprising an organic, sulfur-containing electrolyte solvent and to electrochemical power cells comprising a cobalt trifluoride cathode, a lithium anode and a chelating agent within the electrolyte to chelate cobalt ions.

BACKGROUND OF THE INVENTION

A class of primary electrochemical power cells which incorporates lithium as the anode material and solid or liquid oxidizers as cathode materials is a commercially available source of power in a small, portable package. These lithium cells have theoretical output voltages in the range of 3 to 3.9 volts and theoretical specific energies in the range of 1000 to 2000 Wh/kg. These cells require nonaqueous electrolytes because of the reactivity of lithium in aqueous solutions. Examples of practical lithium cells are lithium carbon monofluoride (3.1 V), lithium sulfur dioxide (3.1 V), lithium manganese dioxide (3.5 V), lithium thionyl chloride (3.6 V) and lithium sulfuryl chloride (3.9 V). See U.S. Pat. Nos. 3,536,532, 3,567,515, and 4,400,453 The output voltage of 3.9 V for the lithium sulfuryl chloride cell is believed to be the highest output voltage achievable in small, portable commercially available electrochemical power cells.

The lithium anode is stable in these cells because a protective film forms on the lithium surface either by direct reaction with the electrolyte or with an additive in the electrolyte. See U.S. Pat. Nos. 3,567,515 and 4,400,453. In commercially available lithium/thionyl chloride and lithium/sulfuryl chloride electrochemical power cells, for example, the protective film produced by the reaction between the lithium and an oxyhalide electrolyte is lithium chloride. These films are typically good ionic conductors for lithium ions, but do not transport species present in the electrochemical power cell that could damage the lithium anode.

These lithium electrochemical power cells are commercially viable only because a mechanically stable electrode of blended carbon black and Teflon® was developed on which solid, liquid or soluble cathode materials could be efficiently reduced. A "solid" cathode material is incorporated into the blend of carbon black and Teflon®. A "liquid" cathode material may be the solvent component of the electrolyte. A "soluble" cathode material is dissolved in the electrolyte. The process of fabricating carbon black-Teflon® electrodes for commercial lithium cells is well established and is described, for example, in Turk, C., *Modern Battery Technology*, p. 291 (1991).

For a number of uses, it is desirable to develop electrochemical power cells with output voltages and specific energies greater than possible with currently available electrochemical power cells.

SUMMARY OF THE INVENTION

The present invention provides generally an electrochemical power cell comprising an anode, a cathode comprising a fluorine compound and an electrolyte to maintain ionic conductivity between the anode and the cathode. Preferably, the water content of the fluorine compound is less than approximately 150 parts per million (ppm). More preferably, the water content of the fluorine compound is less than approximately 100 ppm. Most preferably, the water content of the fluorine compound is less than approximately 50 ppm. The fluorine compound is preferably present as a single phase with a purity of at least approximately 99%.

A number of fluorine compounds, including metal fluoride compounds, nitrosonium fluoride compounds or oxyfluoride compounds are suitable for use in the cathodes of the present invention. Preferably, the fluorine compound is chosen to provide an output voltage of at least approximately 4.0 V. For example, the fluorine compound can be $CoF_3$, $AgF_2$, $XeF_2$, $NO_2SbF_6$, $NO_2BF_4$, or $SbF_5S$. In one preferred embodiment, the fluorine compound is $CoF_3$. In another preferred embodiment, the fluorine compound is $NO_2SbF_6$. The nitrosonium fluoride compounds act as soluble cathodes.

The anode of the present invention preferably comprises an alkali metal or an alkali earth metal. Most preferably, the anode comprises lithium metal.

The present inventors have discovered that the small, portable electrochemical power cells of the present invention preferably provide a voltage of at least approximately 4.0 V. Indeed, voltages of over approximately 5.0 V are preferably achieved. Moreover, the electrochemical power cells of the present invention preferably provide a specific energy of the cathode material of at least approximately 1000 Wh/Kg (Watt·hours per Kilogram). Specific energy as used herein refers generally to the ratio of energy available from a cell to the weight of the cathodic material in a cell (that is, the weight of the fluorine compound).

Given the relatively high voltages achieved in the electrochemical power cells of the present invention, the electrolyte is preferably stable at voltages of at least approximately 4.0 V and, more preferably, at voltages of at least approximately 5.0 V. The electrolyte solvent should also exhibit low chemical reactivity to other components of the electrochemical power cell (for example, the anode, the cathode and the housing). The electrolyte solvent should also exhibit low solubility for the cell reactants and reaction products.

In one embodiment, alkyl carbonates such as ethylene carbonate and dimethyl carbonate are used as solvents (that is, electrolyte solvents) in the electrochemical power cells of the present invention. More preferably, the electrolyte solvent comprises an organic, sulfur compound or sulfur-containing compound such as a sulfone compound, a sulfolane compound and/or a sulfite compound.

Preferably, the cathode comprises a binder material, carbon and the fluorine compound. The binder material, the carbon and the fluorine compound are preferably ball milled and pressed to form the cathode under substantially dry conditions. Preferably, the water content of the binder material, the carbon and the fluorine compound is each less than 150 ppm. More preferably, the water content of the binder material, the carbon and the fluorine compound is each less than 100 ppm. Most preferably, the water content of the binder material, the carbon and the fluorine compound is each less than 50 ppm. The content of the binder material in the cathode preferably ranges between approximately 5 and approximately 10 weight percent. The content of the carbon in the cathode preferably ranges between approximately 10 and approximately 40 weight percent. The content of the fluorine compound in the cathode preferably ranges between approximately 50 and approximately 85 weight percent. The binder material preferably comprises polytetrafluorethylene. Preferably, the binder material is Teflon® 6C available from DuPont. The carbon is preferably acetylene black.

The binder material, the carbon, and the fluorine compound are preferably pressed onto a conductive current collector. The conductive current collector is preferably fabricated from aluminum, stainless steel or nickel. Other acceptable materials for the conductive current collector include titanium or vanadium.

The fluorine compounds of the present invention are typically very powerful oxidizing agents. In the case that alkyl carbonates such as ethylene carbonate and dimethyl carbonate are used as solvents, the electrochemical power cells of the present invention preferably further comprise at least one separator placed in the electrolyte between the cathode and the anode to slow or reduce migration of cathodic material to the anode. Preferably, such separators are fabricated from a porous material such as Gore-Tex®, available from W. L. Gore & Associates, Celgard®, available from Hoechst Celanese, Corp. or Zircar®, available from Zircar Products Inc. Preferably, a first separator is provided adjacent the cathode and a second separator is provided adjacent the anode. The separator adjacent the cathode is preferably Gore-Tex® or Celgard®. The separator adjacent the anode is preferably Zircar®.

In the case that an organic, suflur containing-compound or compounds (for example, an aliphatic sulfone compound and/or a sulfolane compound) are used as the electrolyte solvent, the use of a GoreTex or other separator to prevent or slow migration of the cathodic material to the anode is not required. Organic, sulfur-containing compounds provide particular advantages when the cathode is $CoF_3$. The present inventors have discovered that $Co^{3+}$ ions are less soluble by approximately an order of magnitude in such organic, sulfur-containing compounds than in alkyl carbonates. It is believed that the GoreTex and other separators used in connection with the alkyl carbonate electrolyte solvents slow migration of harmful ions such as cobalt to the anode by creating a more tortuous flow path. However, slowing the transport of ions in the electrochemical power cell also results in a reduction in the current delivered by the electrochemical power cell. Elimination of such separators with the use of organic, sulfur-containing compounds has been found to increase the current delivered by the electrochemical power cell by at least two orders of magnitude as compared to electrochemical power cells in which the electrolyte is an alkyl carbonate and such separators are used. The organic sulfur-containing electrolytes of the present invention are electrochemically stable above 5.0V (versus a Li reference).

Sulfur-based organic solvents suitable for use in the present invention include sulfolane compounds (for example, sulfolane and 3-methylsulfolane), sulfone compounds (for example, alkyl sulfones such as ethylmethylsulfone), and/or a sulfite compound (for example, ethylene sulfite) and mixtures thereof. The solute used in connection with the organic, sulfur-containing electrolyte solvent may, for example, be $LiPF_6$, $LiAsF_6$, $LiAlCl_4$ and/or $LiAlF_4$. The purity of the solutes used in connection with the electrolyte solvents of the present invention is preferably maximized. For example, in the case of the use of $LiPF_6$ in an organic, sulfur-containing electrolyte solvent, the amount of free fluoride is preferably less than approximately 100 ppm. More preferably, the amount of free fluoride in $LiPF_6$ is preferably less than approximately 50 ppm.

Preferably, the purity of sulfur-containing electrolyte solvents of the present invention is maximized. In that regard, the organic, sulfur-containing electrolyte solvents of the present invention preferably have a purity of at least 98%. More preferably, the sulfur-containing electrolyte solvents of the present invention have a purity of at least 99%. The water content of the organic, sulfur-containing electrolyte solvents of the present invention is preferably minimized. Preferably, the water content of the organic, sulfur-containing electrolyte solvents of the present invention is less than 100 ppm. More preferably, the water content of the organic, sulfur-containing electrolyte solvents of the present invention is less than 50 ppm.

A film is preferably produced on the anode of the present invention (for example, a lithium anode) to provide kinetic stability (that is, to inhibit and/or slow down any reaction between the electrolyte components and/or soluble ions and the anode material). Any such film should be a good ionic conductor for the ions of the anode material as such ions must be transported through the film when the cell is discharged. The film should not transport other species that could react with the anode material or be deposited from the electrolyte onto the anode material. It is also desirable to provide for film repair (by an appropriate material soluble in the electrolyte) in the event that the film is disrupted, potentially resulting in an unprotected anode surface. In that regard, uninhibited reaction between the anode material and the electrolyte components or soluble oxidants leads to high parasitic capacity losses during storage.

An additive adapted to produce and/or repair a protective film on the anode may be added to the electrolyte. Additives suitable for use in the present invention include sulfuryl chloride, thionyl chloride, and iodine pentafluoride. Preferably, the additive comprises iodine pentafluoride.

The present invention also provides an electrochemical power cell comprising a lithium anode, a $CoF_3$ cathode, an electrolyte to maintain ionic conductivity between the anode and the cathode and a cobalt complexing material within the electrolyte to complex the cobalt ion. Examples of suitable cobalt complexing materials include chelating agents such as ethylenediaminetetraacetic acid (EDTA, disodium salt) and dimethylglyoxime (DMG, disodium salt). The complexing/chelating agents of the present invention passivate the lithium anode and reduce/prevent corrosion of the lithium.

The present invention also provides a method of fabricating an electrochemical power cell including an anode, a cathode and an electrolyte to maintain ionic conductivity between the anode and the cathode, comprising the step of adding a fluorine compound as described above to the cathode and/or to the electrolyte. Preferably, the electrolyte comprises an organic, sulfur-containing compound as described above.

At present, the highest output voltage of a small, portable, commercially available primary electrochemical power cell is 3.9 V for the lithium/sulfuryl chloride couple. As discussed above, output voltages of greater than 4.0 V, and even greater than 5.0V, can be achieved with the electrochemical power cells of the present invention. Moreover, higher energy densities and specific energies may be achieved in small, portable electrochemical power cells of the present invention than are possible with commercially available electrochemical power cells.

Prior to the present invention, fluorine compounds were not used in cathodes of electrochemical power cells. As used herein, the term "fluorine compound" refers to a compound in which one or more fluorine atoms are chemically bonded to another atom in the compound. This definition excludes intercalation compounds such as carbon monofluoride in which a crystalline lattice of graphite acts as an electron donor for fluorine acceptor atoms interdispersed or diffused between the planes of the lattice. See, Linden, D., *Handbook of Batteries*, 2$^{nd}$ Ed., p 14.60; and Lewis, R. J., *Hawley's Condensed Chemical Dictionary*, 12$^{th}$ Ed., p. 638 (1981).

As used herein, the terms "organic, sulfur-containing compound" or "organic, sulfur compounds" refer to organic compounds in which one or more sulfur atoms are chemically bonded to another atom.

DETAILED DESCRIPTION OF THE INVENTION

Theoretically, a lithium-fluorine electrochemical power cell has the highest output voltage and specific energy (6V and 6000 Wh/kg, respectively) of any type of electrochemical power cell. However, practical electrochemical power cells comprising a fluorine cathode have not been produced because fluorine is gaseous and an extremely powerful oxidizer. In the present invention, fluorine compounds are used instead of fluorine gas in the cathode to provide high output voltage and high energy density.

Figure 1:
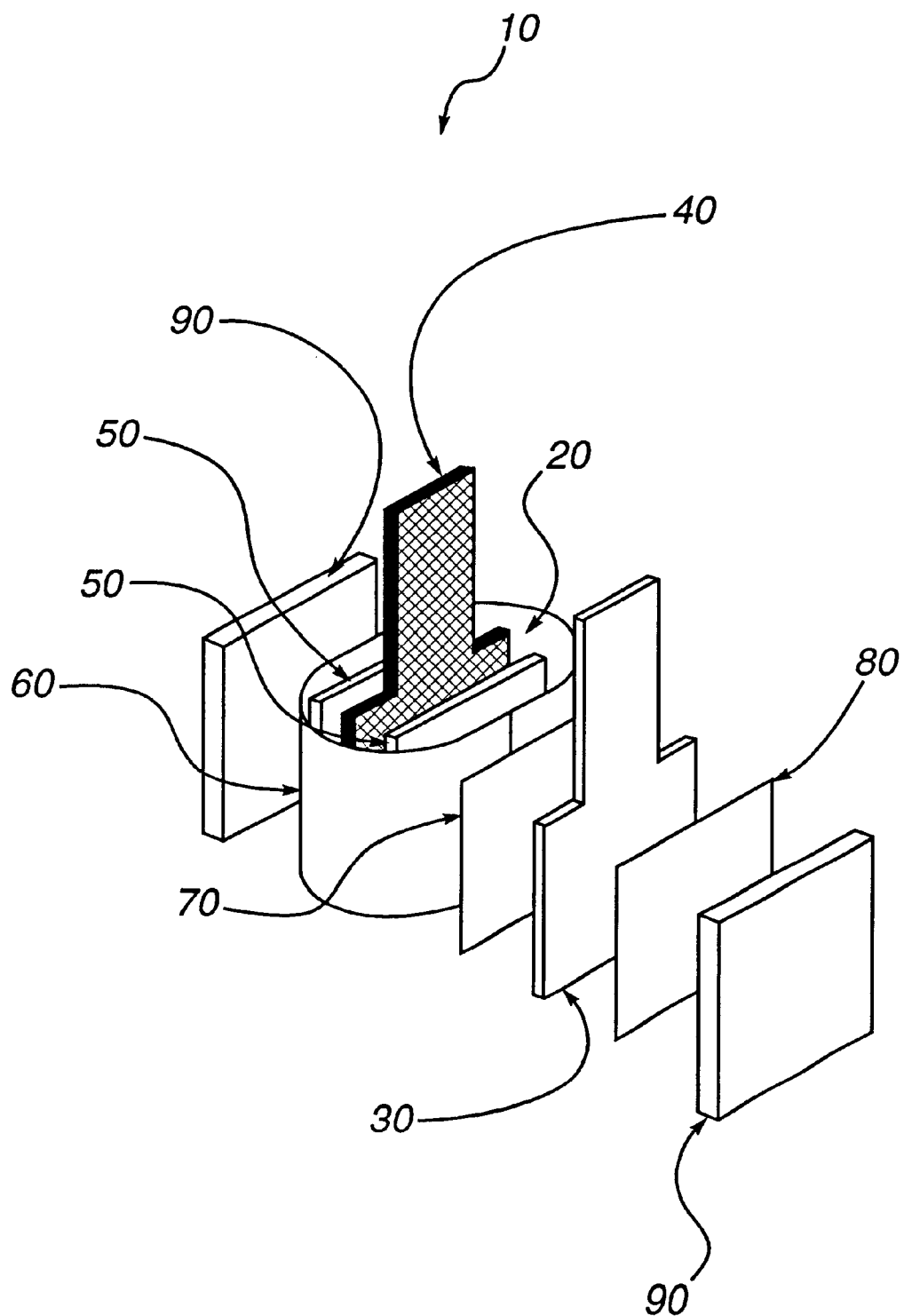
FIG. 1 illustrates one embodiment of an electrochemical power cell of the present invention.

An electrochemical power cell 10 used in the present studies is illustrated in FIG. 1. Electrochemical power cell 10 comprises a cathode 20 and an anode 30. Anode 30 is preferably fabricated from lithium metal.

Cathode 20 preferably comprises a conductive current collector 40 such as an aluminum screen. Preferably, one or more cathode sheets 50 comprising a mixture of a binder, carbon and the fluorine compound are pressed/rolled onto current collector 40. Preferably, such a cathode sheet 50 is pressed onto each side of screen-shaped current collector 40 to improve adherence.

It has been discovered that current techniques for fabricating positive electrodes for electrochemical power cells are unsuitable for use in the present invention. In such techniques, an aqueous slurry of a binder, carbon and a cathodic compound is applied to a current collector. The slurry is then dried under vacuum at relatively high temperatures. However, the fluorine compounds of the present invention are typically relatively thermally unstable and would decompose at temperatures commonly used in vacuum-drying. In any event, the fluorine compounds of the present invention are very hygroscopic and are also unstable in the presence of water.

Thus a novel, room temperature method of forming the cathodes of the present invention was developed. In this process, the binder (Teflon® 6C), the carbon (50% compressed acetylene black available from Chevron) and the fluorine compound (for example, $CoF_3$ available from Advance Research Chemicals, Inc.) were ball milled in a substantially dry state. In that regard, the water content of each of the carbon, the binder and the fluorine compound was most preferably maintained less than 50 ppm. Moreover, the ball milling was carried out in a dry, inert atmosphere to substantially prevent the introduction of water. The ball mill was a ceramic pint jar containing ceramic spheres and cylinders. The ceramic jar was rotated at 20 rpm.

In a model study, $CoF_3$ (30 ppm water) acetylene black (less than 10 ppm water) and Teflon® 6E (less than 10 ppm water) powders were dry-mixed in approximately 25 g batches in a 100 ml beaker using a glass stirring rod under a dry atmosphere of argon in percentages by weight of 80, 10 and 10, respectively. The Teflon® 6E binder had a particle size of approximately 450 $\mu$m. In general, increasing carbon content increases electrical conductivity, allowing better utilization of the cathode, while increasing Teflon® content improves the handling characteristics of the cathode, but reduces the electrical conductivity.

The dry mix was then placed in the ball mill and milled for approximately three hours at 20 rpm under a dry atmosphere of argon. The resulting powders were placed in glass jars for subsequent rolling or pressing. Approximately 7 g of each batch of powder was sieved to obtain a rough estimate of particle size and weight distribution. After three hours of ball milling of the dry powders, a mesh size range of approximately 0.005 mm to 0.050 mm was achieved.

To produce approximately 0.02 inch thick sheets of cathode, approximately 2 g of ball milled materials was spread substantially uniformly between two 3"×4"×1/16" thick Plexiglas plates under a dry atmosphere of argon. The resultant "sandwich" was then place in a polyethylene bag and rolled in the jewelers mill to a successively smaller thickness (for example, 0.085, 0.050, then 0.030 inch). The rolled materials are preferably pressed/rolled onto aluminum current collector 40 to form cathode 20. With oxyfluoride compounds in cathode 20, stainless steel or nickel current collectors are preferably used.

In the case of some electrolyte systems, for example, alkyl carbonates such as ethylene carbonate and dimethyl carbonate, at least one porous, insulating separator is preferably provided between cathode 20 and anode 30 to physically and electrically separate cathode 20 and anode 30. Such separator(s) preferably further reduces migration of undesirable and highly oxidative cathode material to the lithium anode. In the case of $CoF_3$, for example, the cobalt ion may migrate to the lithium anode if there is some solubility of the $CoF_3$ in the electrolyte solvent. Gore-Tex® (an expanded polytetrafluorethylene (PTFE) membrane), Celgard® (a microporous polypropylene) and Zircar® (a woven cloth of zirconium and yttrium oxide fibers) separators have been found to be suitable for use as separators in the present invention. In the embodiment of FIG. 1, a first separator 60 surrounds cathode 20. Preferably, first separator 60 is fabricated from Gore-Tex®. A Gore-Tex® film around cathode 20 has been found to improve voltage stability with a corresponding loss in current density in alkyl carbonate electrolyte systems. In that regard, Gore-Tex® minimizes migration of unwanted cation species to the lithium.

A second separator 70 may be placed between cathode 20 and anode 20. Second separator 70 is preferably fabricated from Zircar®. In FIG. 1, a third separator 80 is provided wherein second separator 70 and third separator 80 are placed on each side of anode 20. Third separator 80 is preferably fabricated form Zircar®. Two Zircar® separators were preferably used to surround the anode to separate the lithium anode from the Gore-Tex® on one side and a Teflon® end plate 90 on the other side. Lithium can react exothermically under certain conditions when in contact with PTFE. The components of electrochemical power cell 10 are preferably encompassed by a housing (not shown) and immersed in an electrolyte as discussed above. Teflon end plates 90, which are chemically compatible with the electrolyte, are preferably used for structural support.

In addition to providing separators to reduce migration of cathode material to anode 30 when using alkyl carbonates as electrolyte solvents, a protective film is preferably formed on anode 30 to extend the life of electrochemical power cell 10. Such a protective film can be formed in a "prepassivation" step and/or formed in-situ during discharge of the cell. Preferably, a protective film is formed upon anode 20 in a prepassivation step as well as in-situ.

In that regard, prepassivation is a technique of growing a specific film on the surface of the anode (for example, lithium) prior to cell assembly to prevent corrosion of the anode during storage and discharge. The passivating film can be formed by chemically reacting the lithium or by mechanical adherence of a film material.

In-situ formation means that the film is grown when the lithium is placed in the electrochemical power cell. In that regard, the prepassivation protective film may break down during discharge of electrochemical power cell 10. Preferably, therefore, protective films are also formed in-situ upon anode 20 during discharge of electrochemical power cell 10. Such in-situ protective films can be formed via incorporation of appropriate additives into the electrolyte. Additives suitable for use in the present invention include sulfuryl chloride, thionyl chloride, and iodine pentafluoride. Such additive are also found to increase current density. The same compounds, together with cyanoacrylate, xenon difluoride (as a source of fluorine gas) and gaseous fluorine, are also suitable for use in formation of a prepassivation film in the case of an alkyl carbonate electrolyte solvent. If the lithium protective films of the present invention are substantially completely effective, separators of lower resistance than those discussed above can be used to separate anode 20 and cathode 30.

Studies of Electrochemical Power Cell with Alkyl Carbonate Electrolyte Systems

A practical electrochemical power cell incorporating cathodes comprising the fluorine compounds of the present invention with lithium anodes requires an electrolyte that is stable at relative high voltages (for example, above 4 V). Electrolyte solvents comprising alkyl carbonates have been found suitable for use in the present invention. Indeed, such electrolyte solvents have been found to be stable even above 5V under certain conditions. In several studies of the present invention a 1:1 mixture of ethylene carbonate and dimethyl carbonate was used as the electrolyte solvent. A lithium hexafluorophosphate solute was incorporated therein. The solute (for example, $LiPF_6$) provides ionic conductivity to the electrolyte solvent. The solute plus the electrolyte solvent is commonly referred to in the art as the "electrolyte." Other electrolytes used in commercially available lithium electrochemical power cells (for example, combinations of $LiAsF_6$ and $LiBF_4$ and electrolyte solvents such as diethylene carbonate and dimethyl carbonate) may be suitable for use in the present invention. An iodine pentafluoride additive was also incorporated into the electrolyte in the present studies.

A number of fluorine compounds including metal fluorides, nitrosonium fluorides and fluorine analogues of the oxyhalides (that is, oxyfluorides) were studied as potential high voltage cathodes for use in primary lithium electrochemical power cells. Studies of several such compounds are summarized in Table 1 below. These compounds include soluble (in the electrolyte solvent(s)) as well as solid materials.

TABLE 1

| Compound Mfg. by ARC | Molecular Weight (g) | Open Circuit Voltage (V) | | Capacity mAh/g[3] | Energy Wh/kg[4] | Assumed No. Electrons |
|---|---|---|---|---|---|---|
| | | Measured[1] | Calculated[2] | | | |
| $CoF_3$ | 115.9 | 5.2 | 5.4 | 231 | 1150 | 1 |
| $AgF_2$ | 145.9 | 4.3 | 4.5 | 367 | 1578 | 2 |
| $XeF_2$ | 169.3 | 4.0 | — | 316 | 1266 | 2 |
| $IF_5$ | 221.9 | 4.0 | — | 241 | 966 | 2 |
| $NO_2SbF_6$ | 281.1 | 4.9 | — | 381 | 1867 | 4 |
| $NO_2BF_4$ | 132.8 | 4.8 | — | 403 | 1934 | 2 |
| $SbF_5S$ | 248.7 | 4.6 | — | 431 | 1982 | 4 |
| $(SbF_5)_2I$ | 562.4 | 4.7 | — | 238 | 1118 | 5 |
| $SbF_5I$ | 343.6 | 4.6 | — | 432 | 1076 | 3 |
| $VOF_3$ | 123.9 | 4.4 | — | 234 | 1900 | 2 |

TABLE 1-continued

| Compound Mfg. by ARC | Molecular Weight (g) | Open Circuit Voltage (V) | | Capacity mAh/g[3] | Energy Wh/kg[4] | Assumed No. Electrons |
|---|---|---|---|---|---|---|
| | | Measured[1] | Calculated[2] | | | |
| $VF_4$ | 126.9 | 4.3 | — | 217 | 907 | 1 |
| $NOSbF_6$ | 265.1 | 4.3 | — | 303 | 1303 | 3 |
| $MnF_3$ | 111.9 | 4.1 | — | 239 | 980 | 1 |

[1]Measured in a hanging glass cell.
[2]Calculated from Joint Army Navy Air Force thermodynamic data.
[3]Calculated based on assumed number of electrons. The assumed number of electrons is the number of electrons associated with the "assumed" or postulated chemical equation for the discharge reaction.
[4]Calculated from the measured OCV multiplied by the theoretical mAh/g.

Based on physical properties, stability, safety, preliminary voltage measurements and calculated energy densities, the following six compounds are preferred: $CoF_3$, $AgF_2$, $XeF_2$, $NO_2SbF_6$, $NO_2BF_4$ and $SbF_5S$. More preferably, the fluorine compound is $CoF_3$ or $NO_2SbF_6$. Most preferably, the fluorine compound is $CoF_3$. However, fluorine compounds other than $CoF_3$ or $NO_2SbF_6$ were not optimized for purity and/or water content in the present studies.

Figure 2:
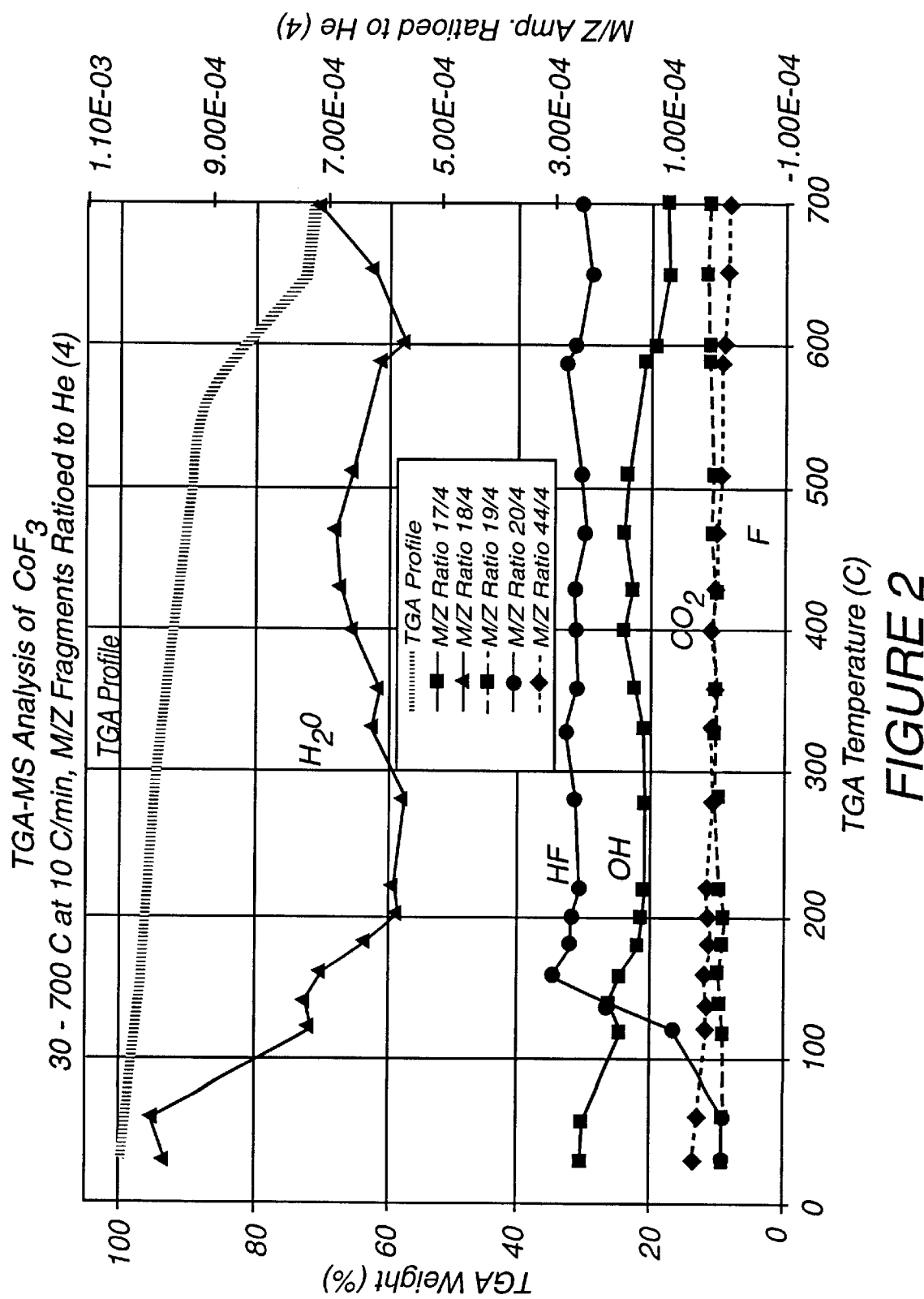
FIG. 2 is a thermal gravimetric-mass spectroscopy (TGA-MS) study of $CoF_3$ used in a cathode of the present invention, demonstrating the presence of water and the temperature at which it is thermally removed.

As discussed above, it has been discovered that the best results are obtained in the electrochemical power cells of the present invention if the fluorine compound used in the cathode is of relative high purity and as water-free as possible. ThermoGravimetric-mass spectroscopy (TGA-MS), x-ray diffraction (XRD), scanning electron microscopy (SEM) and Karl Fischer analytical techniques were used to measure purity and moisture content of the fluorine compounds. ThermoGravimetric analysis when coupled with mass spectroscopy allows quantitative determination of a particular decomposition product. FIG. 2 illustrates the TGA profile of $CoF_3$. Water is initially present and is released at approximately 100° C. Karl Fischer studies indicated, for example, that moisture levels as low as 30 ppm have been obtained for cobalt trifluoride.

As also discussed above, a single phase fluorine compound with a purity of greater than approximately 99% is preferably used. The effects of the presence of $CoF_2$ in the desired $CoF_3$ cathodic material upon initial open circuit voltage (OCV) is presented in Table 2.

TABLE 2

| % $CoF_2$ | Initial OCV (V) |
|---|---|
| 100 | 3.2 |
| 50 | 4.7 |
| 0 | 5.2 |

Table 3 below illustrates the effect of water content on voltage stability in an electrochemical power cell of the present invention.

TABLE 3

| Water Content (ppm) | Initial OCV (V) | Time (hr) to 4V |
|---|---|---|
| 500 | 5.2 | 50 |
| 300 | 5.2 | 140 |
| 30 | 5.2 | >500 |

Figure 3A:
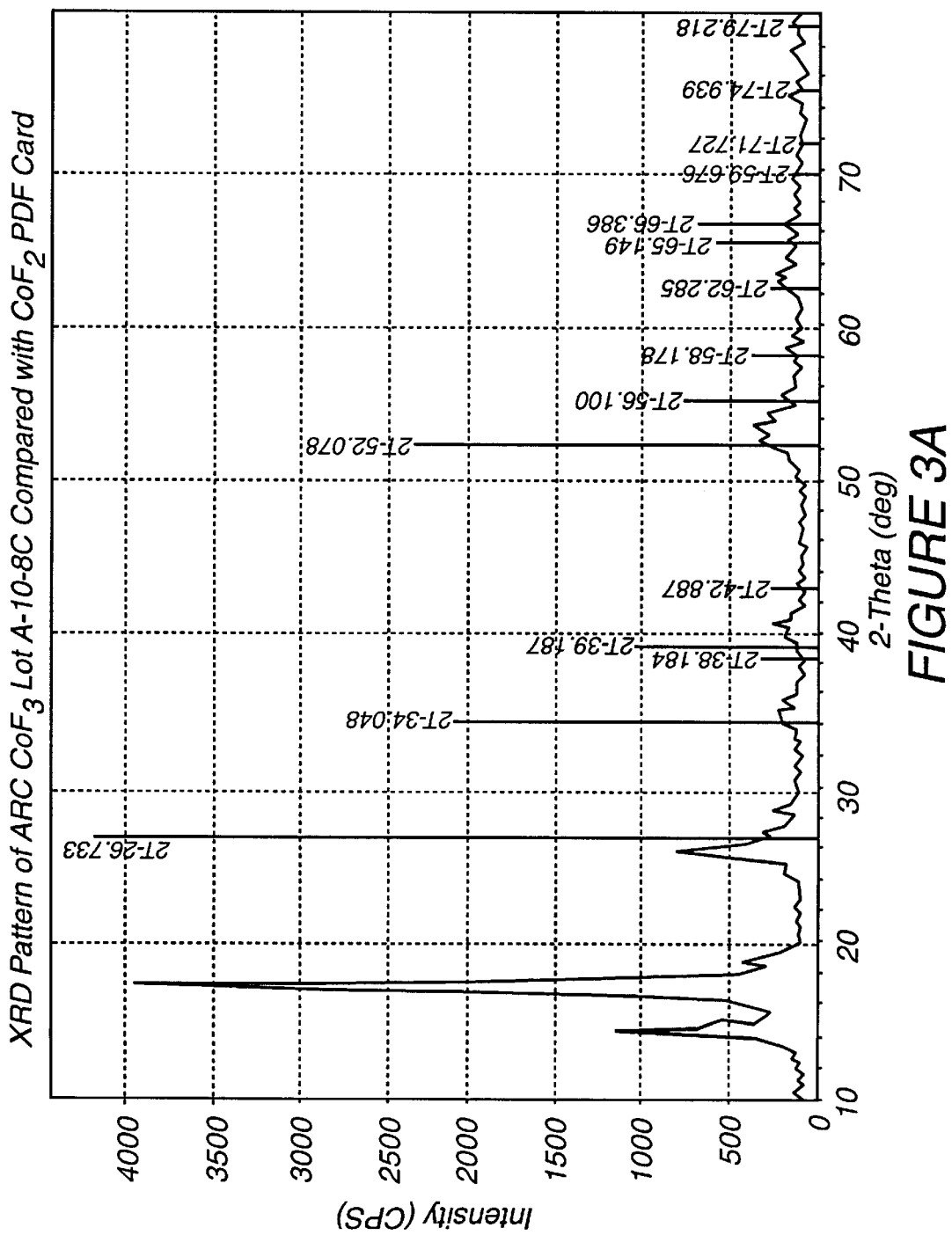
FIG. 3A is an X-ray diffraction study of $CoF_3$ demonstrating a mixed phase (as determined by a comparison to a known X-ray diffraction pattern for crystalline $CoF_3$).
Figure 3B:
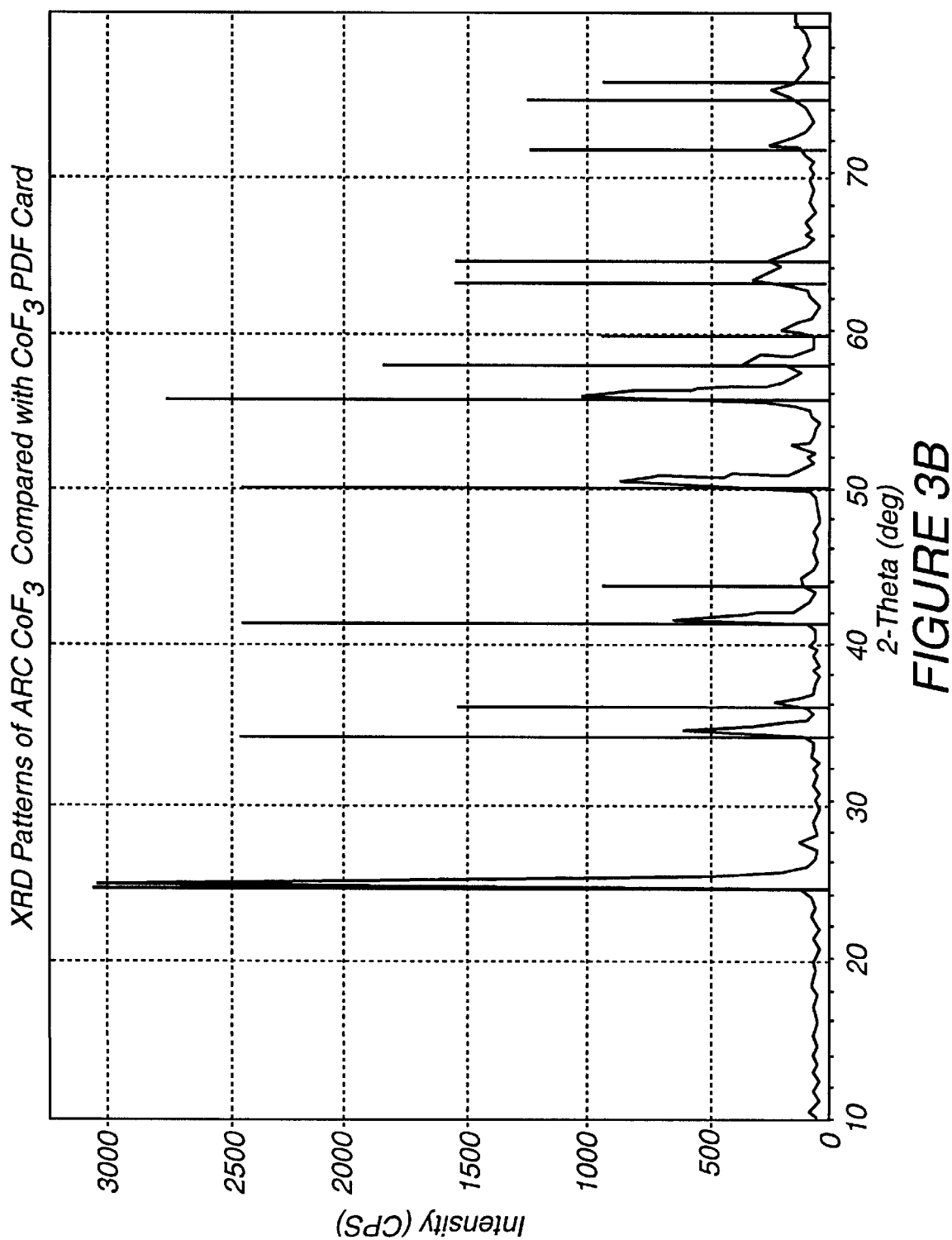
FIG. 3B is an X-ray diffraction study of $COF_3$ used in a cathode of the present invention, demonstrating high, single-phase purity (greater than 99% as determined by a comparison to a known X-ray diffraction pattern for crystalline $CoF_3$).

X-ray diffraction is widely used for material and phase identification since the diffraction pattern obtained is characteristic of the atomic structure, both in terms of its spatial pattern and intensity distribution. In the present studies, the diffraction pattern from the test material was compared with the diffraction pattern obtained for a pure crystal of the material by the National Institute of Standards and Technology (NIST). For example, the X-ray diffraction study of FIG. 3A indicates that a mixed phase of $CoF_3$ and $CoF_2$ is present in the test material of FIG. 3A. This mixed phase material also had a very high water content. Such an impure material resulted in a low voltage when used as a cathodic material. The X-ray diffraction study of FIG. 3B, on the other hand, indicates that a substantially pure (approximately, 100% purity) crystal was produced for the cobalt trifluoride test material of FIG. 3B. A substantially pure crystalline structure was also produced for nitrosonium fluoride compound.

The electrochemical reaction for a lithium/cobalt trifluoride electrochemical power cell is:

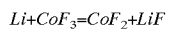

$$Li + CoF_3 = CoF_2 + LiF$$

As indicated in Table 1, the thermodynamic OCV potential calculated for this couple is 5.4 volts. The measured voltage of the electrochemical power cell in accordance with the present invention is 5.2 volts. The capacity of the fluorine compound material only, based on a one electron change, is 230 milliampere hours per gram. The specific energy at 5 volts would be 1150 watt hours per kilogram.

Figure 4:
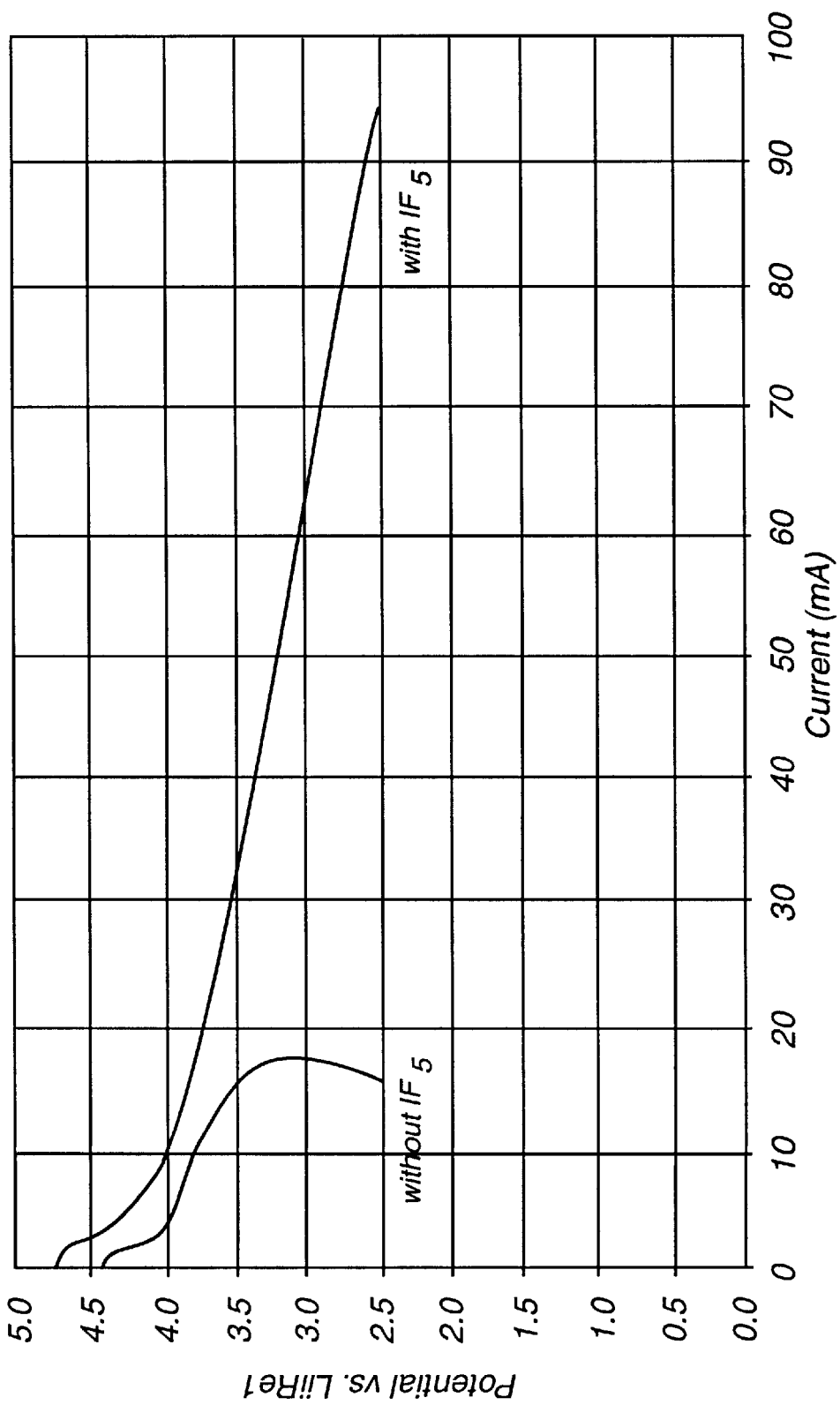
FIG. 4 illustrates a comparative study of the cell potential of an electrochemical power cell comprising a $CoF_3$ cathode and a lithium anode at different currents with and without an iodine pentafluoride additive added to the electrolyte.

FIG. 4 illustrates a comparative study of the cell potentiodynamic sweep of the lithium/$CoF_3$ model electrochemical power cell with and without an iodine pentafluoride additive. The electrolyte solvent in this experiment was 1:1 ethylene carbonate/dimethylcarbonate. As discussed above, the electrolyte solute was one molar lithium hexafluorophosphate. As illustrated, the iodine pentafluoride additive increases the current density capability of the electrochemical power cell. The iodine pentafluoride additive also acted to create an in-situ protective film on the lithium anode during discharge and, thereby, extended the life of the electrochemical power cell.

Figure 5:
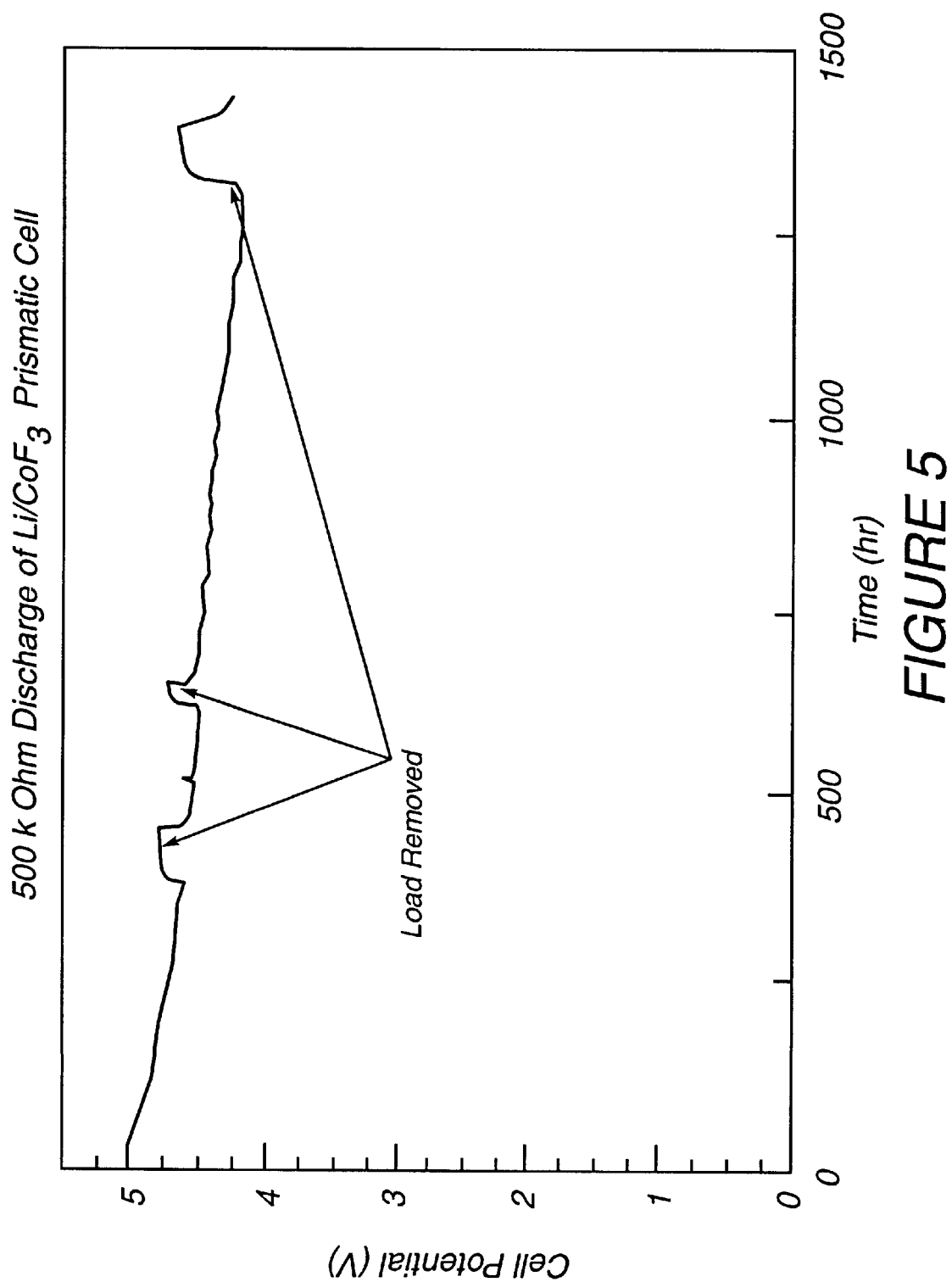
FIG. 5 illustrates the cell potential of an electrochemical power cell comprising a $CoF_3$ cathode and a lithium anode when discharged on a 500 kOhm fixed resistance load.

FIG. 5 illustrates a voltage-time curve for a 500 kOhm discharge (10 micro amperes per square centimeter) of a Li/$CoF_3$ prismatic cell. As illustrated, in FIG. 5, the electrochemical power cells of the present invention are capable of generating a cell potential of greater than 4 V for well over 1000 hours.

Studies of Electrochemical Power Cells with Organic Sulfur-Containing Electrolyte Systems In several other studies of the present invention, a sulfone and/or sulfolane electrolyte systems was used in an electrochemical power cell of the present invention. Prior electrolyte solvents and salts, when evaluated for voltage stability (versus Li references) [for example, propylene carbonate (PC), ethylene carbonate (EC), dimethylsulfoxide (DMSO), dimethylcarbonate (DMC) as solvents and $LiPF_6$, lithium trifluoromethanesulfonate (triflate) and lithium trifluoromethanesulfonimide (imide) as salts] typically exhibit voltage stability below 4.5V, as determined by potentiodynamic tests (sweeps). Laboratory cells constructed with lithium anodes and $CoF_3$-based cathodes (with the above electrolytes and salts) failed prematurely for the following reasons: 1) the electrolyte solvents were unstable at the cell potential (5.0–5.2V); 2) the electrolyte solvents were incompatible with the $CoF_3$ in the cathode; 3) the lithium anode was corroded (blackened) from the generation of LiF; and/or 4) the LiF coating on the anode increased anode resistivity. The organic, sulfur-containing electrolytes of the present invention, based, for example, on sulfolane and/or sulfone compound and $LiPF_6$ and/or other salts/solutes were found to prevent such problems, while increasing the current delivered by the electrochemical power cells.

The electrochemical cells used in the present studies comprised a Li anode, a $CoF_3$ cathode, a Zircar® separator/absorber, a cathode current collector, an anode current collector and an electrolyte (comprising, an organic sulfur-based electrolyte solvent), which was absorbed by the separator/absorber. The anode and cathode current collectors were separated from each other by the porous separator/absorber. The anode current collector was a nickel screen with a welded nickel tab. The cathode current collector was an aluminum screen with a welded aluminum tab.

Figure 6:
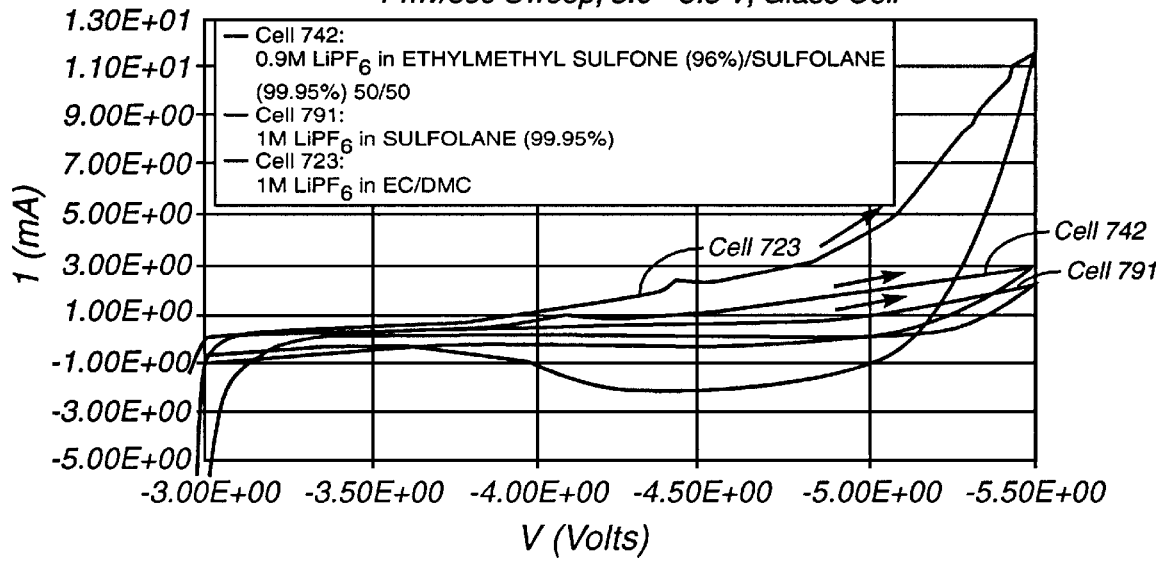
FIG. 6 illustrates potentiodynamic sweeps with several different electrolyte systems.

The potentiodynamic sweeps of FIG. 6 illustrate the improved voltage stability window of organic, sulfur-containing electrolytes compared with an example of an alkyl carbonate electrolyte, 1M $LiPF_6$ in EC/DMC (50/50 wt/wt). The electrolytes of FIG. 6, based on sulfolane and ethylmethylsulfone (EMSF), were 0.9M $LiPF_6$ in EMSF/sulfolane (50/50 wt/wt) and 1M $LiPF_6$ in sulfolane.

Figure 7:
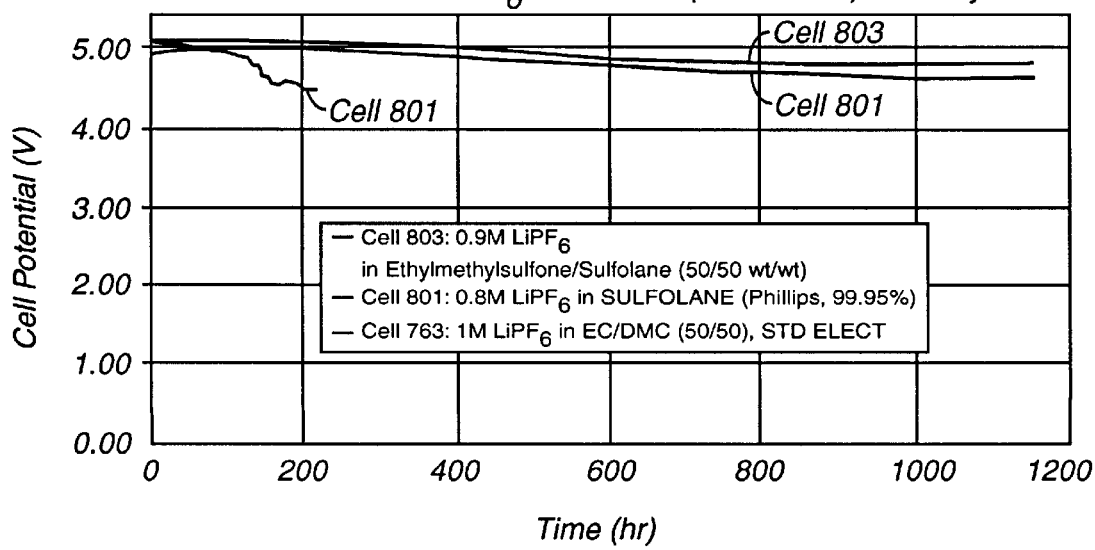
FIG. 7 illustrates studies of the open cell voltage stability of cells with lithium anodes and $CoF_3$ cathodes in several electrolyte systems.

FIG. 7 compares the open circuit stability of cells (Li anode and $CoF_3$ cathode) constructed with 0.9M $LiPF_6$ in EMSF/sulfolane (50/50 wt/wt, cell 803) and 0.8M $LiPF_6$ in sulfolane (cell 801) electrolytes with a representative alkyl carbonate electrolyte comprising 1M $LiPF_6$ in EC/DMC (50/50 wt/wt, cell 763). The organic, sulfur-containing electrolyte solvents improve the open current stability of the electrochemical power cells.

Figure 8:
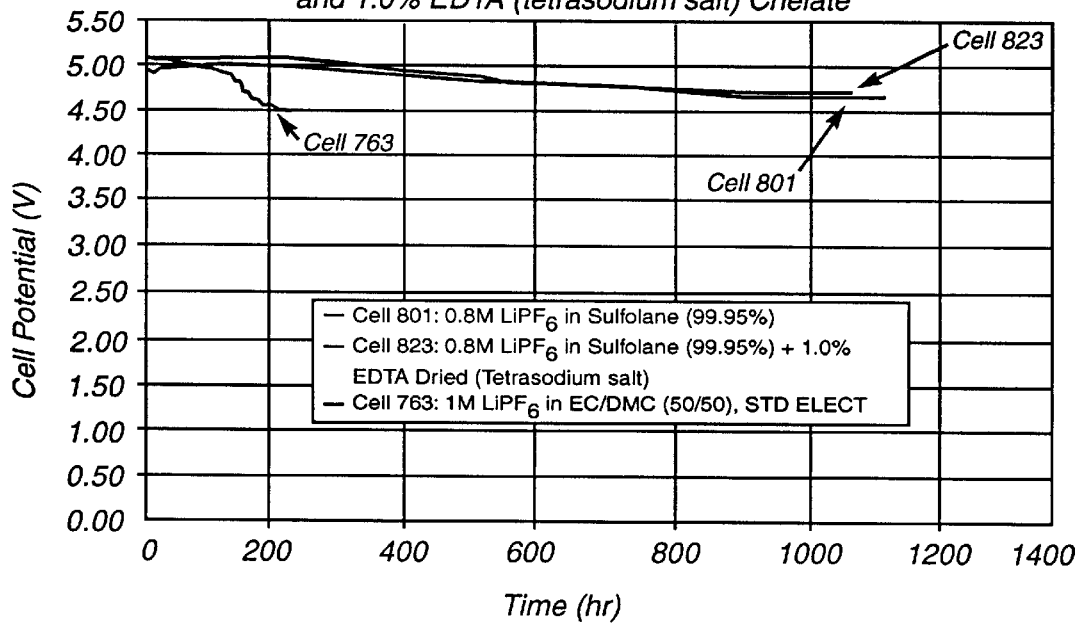
FIG. 8 illustrates comparative studies of the open cell voltage stability of cells with and without chelates in the electrolyte system.
Figure 9:
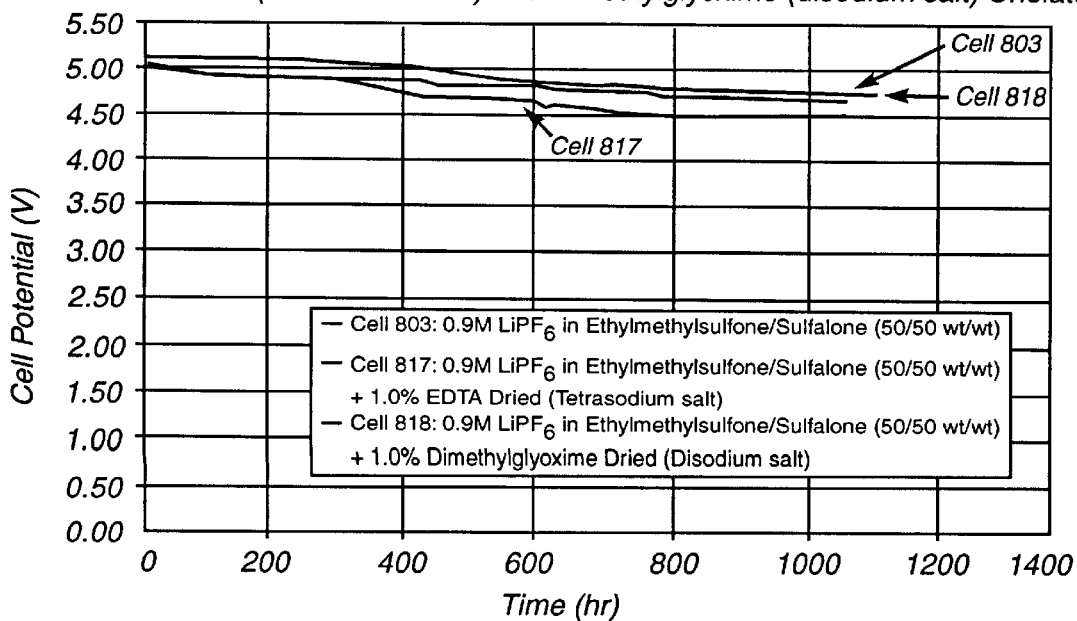
FIG. 9 illustrates comparative studies of the open cell voltage stability of cells with and without chelates in the electrolyte system.

Several cells (Li anode and $CoF_3$ cathode) were also constructed with and without chelates added to the electrolytes. The function of such chelates is to complex cobalt ions (from the solubility of $CoF_3$) in the electrolyte and to passivate the Li anode and prevent the corrosion of Li. FIG. 8 compares the open circuit voltage stability of a Li/$CoF_3$ electrochemical power cell with 0.8M $LiPF_6$ in sulfolane electrolyte with and without 1.0% tetrasodium salt of ethylenediaminetetraacetic acid (EDTA) added to the electrolyte. FIG. 9 compares the open circuit voltage stability of 0.9M $LiPF_6$ in an ethylmethylsulfone/sulfolane (50/50 wt/wt) electrolyte with and without 1.0% tetrasodium salt of ethylenediaminetetraacetic acid (EDTA) and 1.0% disodium salt of dimethylglyoxime (DMG) chelates.

In the above studies of the present invention, the solute was 0.80M $LiPF_6$ or 0.80M $LiAsF_6$ in the sulfolane electrolyte systems. In the sulfolane/ethylmethysulfone (50/50 wt/wt) electrolyte the solute was 0.90M $LiPF_6$ or 0.90M $LiAsF_6$. The solute in the 3-methylsulfolane electrolyte system was 0.80M $LiPF_6$ or 0.80M $LiAsF_6$. In the 0.80M $LiPF_6$ or 0.80M $LiAsF_6$ in sulfolane electrolyte the chelate additive was 1.0% EDTA. In the 0.90M $LiPF_6$ or 0.90M $LiAsF_6$ in sulfolane/ethylmethylsulfone electrolytes the chelates were 1.0% EDTA or 1.0% DMG.

Figure 10:
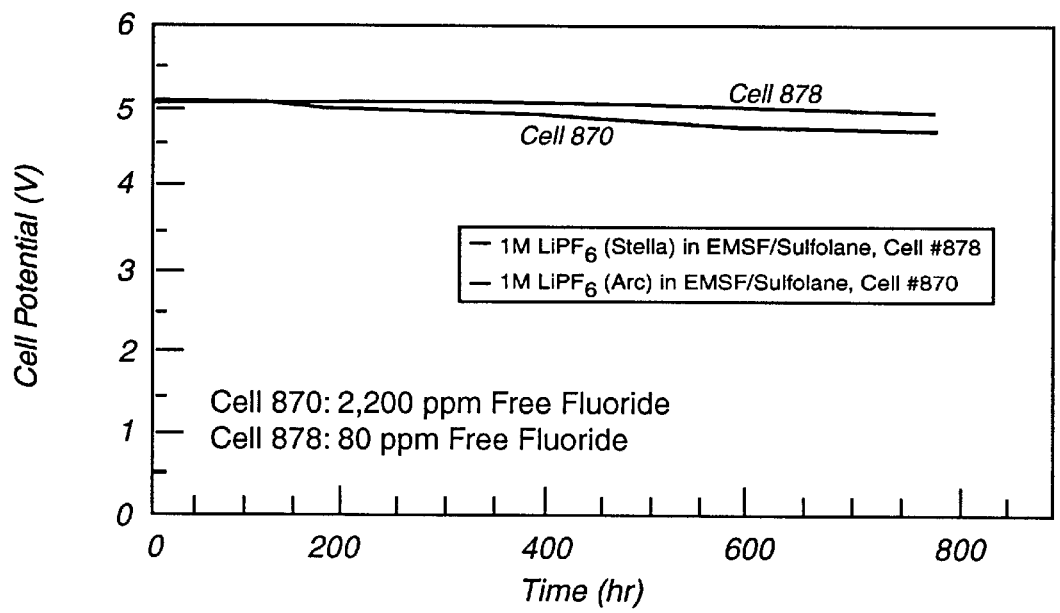
FIG. 10 illustrates a study of the effect the purity of the electrolyte solute upon open cell voltage stability.

FIG. 10 illustrates the effect of electrolyte solute purity on open current voltage stability. In this study, the open current voltage stability of an electrolyte comprising 1M $LiPF_6$ (80 ppm free fluoride, cell 870) in an ethylmethylsulfone/sulfolane mixture and an electrolyte comprising 1M $LiPF_6$ (1200 ppm free fluoride, cell 870) in an ethylmethylsulfone/sulfolane mixture were compared. The higher purity electrolyte solute results in greater open current voltage stability. Indeed, the cell potential of the electrolyte including the higher purity solute remained approximately 5V for nearly 800 hours.

Although the present invention has been described in detail in connection with the above examples, it is to be understood that such detail is solely for that purpose and that variations can be made by those skilled in the art without departing from the spirit of the invention except as it may be limited by the following claims.

What is claimed is:

1. An electrochemical power cell comprising an anode, a cathode including a fluorine compound with a water content less than approximately 150 ppm and an electrolyte comprising an organic, sulfur-containing compound to maintain electrical conductivity between the anode and the cathode, the electrochemical power cell having a voltage greater than 4.0 volts and wherein the fluorine compound is $CoF_3$, $AgF_2$, $XeF_2$, $NO_2SbF_6$, $NO_2BF_4$, or $SbF_5S$.

2. The electrochemical power cell of claim 1 wherein the purity of the fluorine compound is at least approximately 99%.

3. The electrochemical power cell of claim 1 wherein the cathode comprises a binder material, carbon and the fluorine compound.

4. The electrochemical power cell of claim 3 wherein the water content of the binder material, the carbon and the fluorine compound is each less than 150 ppm.

5. The electrochemical power cell of claim 4 wherein the content of the binder material in the cathode ranges between approximately 5 and approximately 10 weight percent, the content of the carbon in the cathode ranges between approximately 10 and approximately 40 weight percent, and the content of the fluorine compound in the cathode ranges between approximately 50 and approximately 85 weight percent.

6. The electrochemical power cell of claim 1 wherein the electrolyte comprises a sulfolane compound, a sulfone compound or a sulfite compound.

7. The electrochemical power cell of claim 1 wherein the anode comprises an alkali metal or an alkali earth metal.

8. The electrochemical power cell of claim 7 wherein the anode comprises lithium metal.

9. The electrochemical power cell of claim 8 wherein the output voltage of the electrochemical power cell is at least approximately 5.0 volts.

10. The electrochemical power cell of claim 9 wherein the specific energy of the electrochemical power cell is at least approximately 1000 Wh/kg.

11. The electrochemical power cell of claim 9 wherein the fluorine compound is $CoF_3$.

12. The electrochemical power cell of claim 11 wherein a complexing agent is added to the electrolyte to complex cobalt ions.

13. The electrochemical power cell of claim 12 wherein the complexing agent is a tetrasodium salt of ethylenediaminetetraacetic acid or a disodium salt of dimethylglyoxime.

14. The electrochemical power cell of claim 1 wherein the electrolyte includes a solute comprising $LiPF_6$, $LiAsF_6$, $LiAlCl_4$ or $LiAlF_4$.

15. The electrochemical power cell of claim 14 wherein the solute is $LiPF_6$ and has a free fluoride content of less than approximately 100 ppm.

16. The electrochemical power cell of claim 1 wherein the purity of the organic, sulfur-containing compound is at least approximately 98%.

17. The electrochemical power cell of claim 1 wherein the water content of the organic, sulfur-containing compound is less than approximately 100 ppm.

18. The electrochemical power cell of claim 1 wherein the organic, sulfur-containing compound comprises sulfolane, 3-methylsulfolane, ethylmethylsulfone, or ethylene sulfite.

19. A method of fabricating an electrochemical power cell including an anode and a cathode and the cell having a voltage of greater than 4.0 volts, the cathode comprising a fluorine compound: (I) having a water content less than approximately 150 ppm and (ii) which is a metal fluoride, a nitrosonium fluoride or an oxyfluoride, the method comprising the step of adding an electrolyte comprising an organic, sulfur-containing compound to the electrical conductivity between the anode and the cathode.

20. The method of claim 19 wherein the fluorine compound is $CoF_3$, $AgF_2$, $XeF_2$, $NO_2SbF_6$, $NO_2BF_4$, or $SbF_5S$.

21. The method of claim 20 wherein the fluorine compound is $CoF_3$.

22. An electrochemical power cell comprising an anode, a cathode including a fluorine compound with a water content less than approximately 150 ppm and an electrolyte comprising an organic, sulfur-containing compound to maintain electrical conductivity between the anode and the cathode, the electrochemical power cell having a voltage greater than 4.0 volts and wherein the fluorine compound is a metal fluoride, a nitrosonium fluoride or an oxyfluoride.

* * * * *